United States Patent [19]

Noland et al.

[11] Patent Number: 4,739,885
[45] Date of Patent: Apr. 26, 1988

[54] APPARATUS FOR HOLDING ATTACHMENTS TO FOOD MIXERS

[76] Inventors: Allen K. Noland; Roberta G. Noland, both of 1730 Rock Ridge Pl., Colorado Springs, Colo. 80906

[21] Appl. No.: 9,217

[22] Filed: Jan. 30, 1987

[51] Int. Cl.⁴ .............................................. B65D 1/34
[52] U.S. Cl. ................................... 206/553; 206/806; 206/493; 403/349; 211/70.6; 211/13
[58] Field of Search ...................... 211/70.6, 86, 89, 13, 211/4; 312/248; 248/222.3; 206/806, 493, 553; 403/349; 24/596, 594, 628

[56] References Cited

U.S. PATENT DOCUMENTS

| | | |
|---|---|---|
| 1,712,473 | 5/1929 | McWethy . |
| 2,516,195 | 7/1950 | Finton ............................. 403/349 X |
| 2,723,876 | 11/1955 | Langlois et al. ................. 403/349 X |
| 3,423,781 | 1/1969 | Henson ............................ 403/349 X |
| 4,043,453 | 8/1977 | Greenlee . |
| 4,337,860 | 7/1982 | Carrigan . |
| 4,353,456 | 10/1982 | Rado . |

FOREIGN PATENT DOCUMENTS 335957 10/1930 United Kingdom ................. 24/596

*Primary Examiner*—Ramon S. Britts
*Assistant Examiner*—Sarah A. Lechok Eley
*Attorney, Agent, or Firm*—Henderson & Sturm

[57] ABSTRACT

A rack for storing food mixer attachments comprising a housing adapted to be connected to the underside of a kitchen cabinet and having a plurality of cylindrical posts extending downwardly therefrom. A cylindrical pin is attached to the post intermediate the ends thereof. An annular washer is disposed around the post and is located between the pin and the housing. A helical compression spring is disposed around the post and has one end thereof in abutment with the housing and the other end thereof in abutment with the annular washer for biasing the annular washer toward the pin. Attachements to food mixers of a certain type can then be placed on the posts and locked on by the pin, such attachments being of a type having a circular opening in one end thereof with a slot going down one side of the circular opening and leading to one side of a second slot which is formed in an arc around the axis of the circular opening. The other end of the second slot has a notch therein. Consequently, the attachment can be placed onto the post with one end of the attachment being used to push the washer towards the housing and away from the pin and allowing the pin to slide down into the first slot until it comes to the second slot, whereupon the attachment can be manually rotated so that the second slot is moved with respect to the pin until the pin is into the notch formed on the other end of the second slot. At such time the attachment is stored until a reverse procedure is used to disengage it from such attachment to use it on a food mixer.

1 Claim, 1 Drawing Sheet

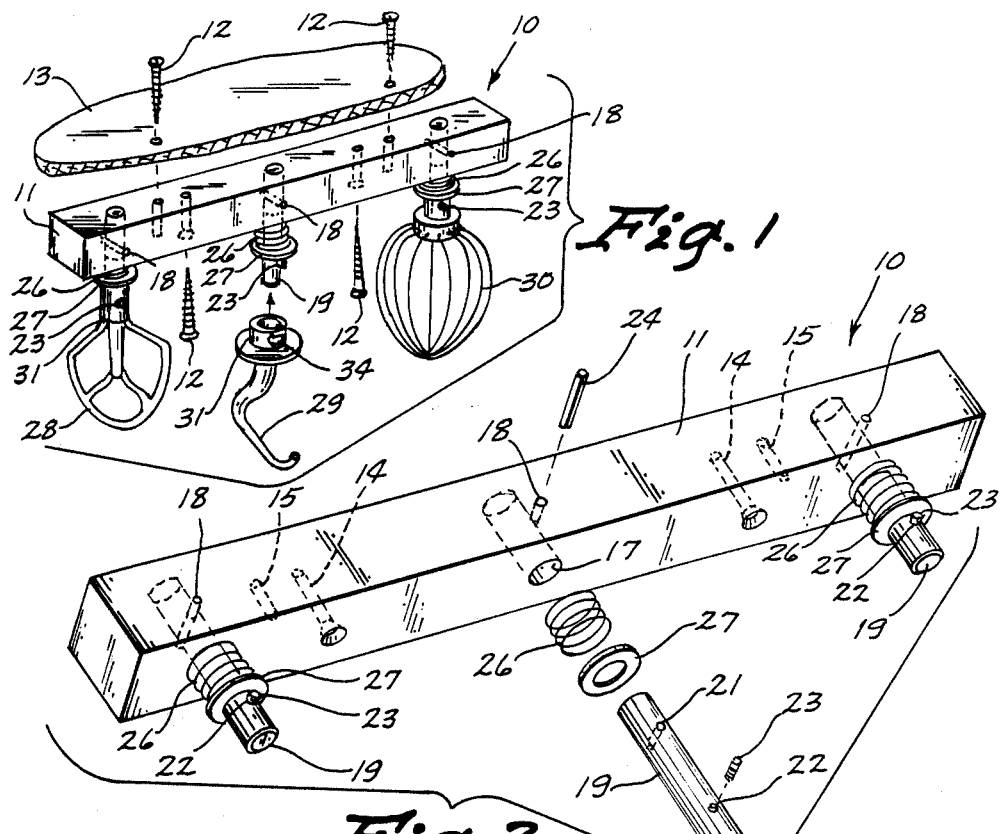
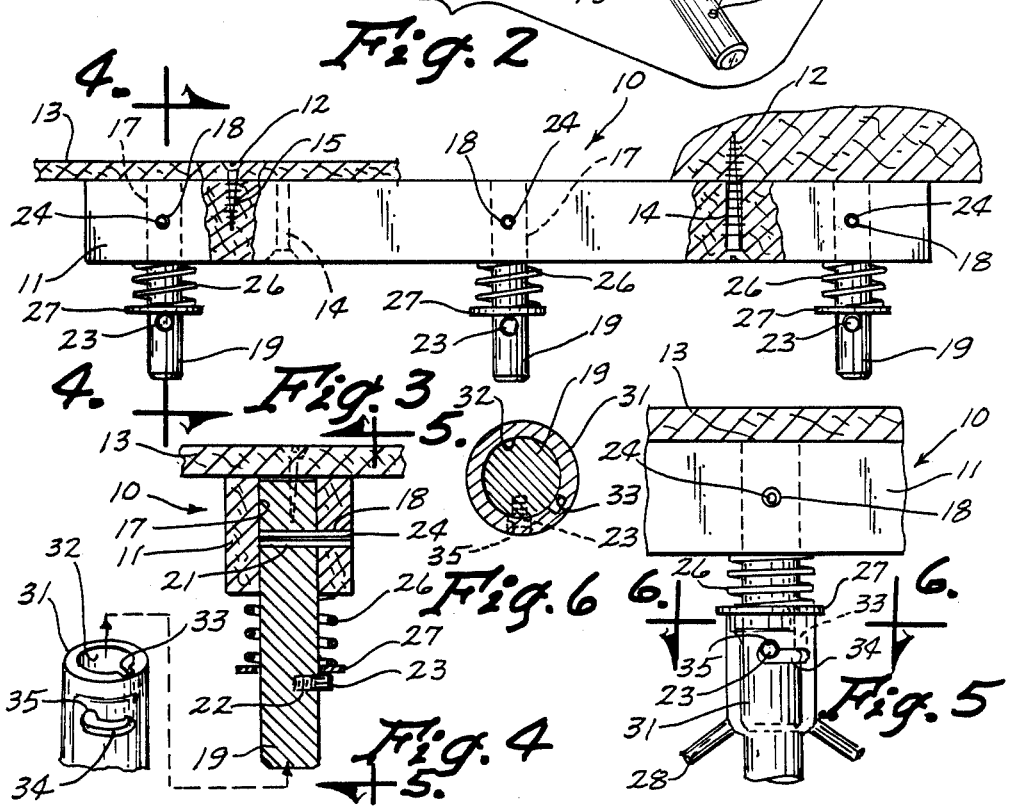

APPARATUS FOR HOLDING ATTACHMENTS TO FOOD MIXERS

TECHNICAL FIELD

The present invention relates generally to racks, and more particularly to a rack for storing attachments to a food mixer.

BACKGROUND ART

Storage of attachments for food mixers is somewhat of a problem in that they require a drawer or shelf space in the kitchen. If stored in a drawer, the wires on a whip attachment can be bent and the vinyl coating on the hook or beater can be damaged. The replacement cost is extremely high. This is especially true on a KitchenAid brand mixer by the Hobart Corporation, which is generally considered to be the best food mixer made for home use. Two of such models are in commercial production and have been available for over twenty years without a major design change.

Consequently, there is a need for some way to store attachments for a food mixer other than storing them in a drawer or on a shelf.

DISCLOSURE OF THE INVENTION

The present invention relates to a rack for storing food mixer attachments comprising a housing adapted to be connected to the underside of a kitchen cabinet and having a plurality of cylindrical posts extending downwardly therefrom. A cylindrical pin is attached to the post intermediate the ends thereof. An annular washer is disposed around the post and is located between the pin and the housing. A helical compression spring is disposed around the post and has one end thereof in abutment with the housing and the other end thereof in abutment with the annular washer for biasing the annular washer toward the pin. Attachments to food mixers of a certain type can then be placed on the posts and locked on by the pin, such attachments being of a type having a circular opening in one end thereof with a slot going down one side of the circular opening and leading to one side of a second slot which is formed in an arc around the axis of the circular opening. The other end of the second slot has a notch therein. Consequently, the attachment can be placed onto the post with one end of the attachment being used to push the washer towards the housing and away from the pin and allowing the pin to slide down into the first slot until it comes to the second slot, whereupon the attachment can be manually rotated so that the second slot is moved with respect to the pin until the pin is into the notch formed on the other end of the second slot. At such time the attachment is stored until a reverse procedure is used to disengage it from such attachment to use it on a food mixer.

An object of the present invention is to provide an improved rack for storing attachments to a food mixer.

Another object of the present invention is to provide a rack for attachments to a food mixer so that such attachments are not required to be stored in a drawer or on a shelf.

A further object of the present invention is to provide a rack of the aforementioned type which is economical to produce and dependable to use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention shown in use with certain parts thereof exploded away for clarity;

FIG. 2 is still another perspective view of the present invention showing one of the posts, washers, springs and roll pins exploded away to illustrate how it is assembled;

FIG. 3 is a front elevational view of the rack of FIGS. 1 and 2;

FIG. 4 is a cross sectional view taken along line 4—4 of FIG. 3 when not in use;

FIG. 5 is a view taken along line 5—5 of FIG. 4 at a time when a food mixer attachment is attached thereto; and FIG. 6 is a cross-sectional view taken through line 6—6 of FIG. 5 when a food mixer attachment is attached thereto.

BEST MODE FOR CARRYING OUT THE INVENTION

Referring now to the drawings, wherein like reference numerals designate identical or corresponding parts throughout the several views, FIG. 1 shows a rack (10) constructed in accordance with the present invention having a housing (11) constructed of wood, metal or plastic, for example, and being attached by screws (12) to the bottom of a kitchen cupboard (13). Openings (14) through the housing (11) are provided for allowing the lower screws (12) to extend through the housing (11) and the upper holes (15) in the housing (11) are provided for receiving the bottom portion of the upper screws (12).

Referring now to FIG. 2, it is noted that three spaced apart openings (17) are provided and each have another opening (18) connected thereto through the housing (11). A mounting post (19), preferably made of metal, has a first opening (21) therein and a second opening (22) therein. The second opening (22) has a pin (23) secured therein; this pin (23) can be force fit into the opening (22) so that it will not come out or move. The post (19) is slid into the opening (17) and then a roll pin (24) of a spring-type can be forced into the opening (18) and also into the opening (21) in the post (19) to hold the post (19) securely in place within the opening (17). At the same time that this is done, the coil compression spring (26) and washer (27) are oriented as shown in FIGS. 2 and 3 so that the compression spring (26) will bias the washer (27) against the pin (23).

When it is desired to store a food mixer attachment (28, 29 or 30) to the rack, one end (31) of the attachment having an inner circular opening (32) therein and a first slot (33) therein is pushed onto the post (19), aligning the first slot (33) with the pin (23). Once the end (31) of the attachment contacts the washer (27), it will push the washer (27) to a place slightly beyond the point shown in FIG. 5. At the same time, the pin (23) will be aligned with the first slot (33) until the pin (23) arrives at the point of the second slot (34). At such time, the attachment and the end (31) thereof is rotated to move the end (31) and slot (34) from a position wherein the pin (23) is just below slot (33) to a position shown in FIG. 5 whereupon the spring (26) will force the pin (23) into a notch (35) connected to the second slot (34). The attachment (30) will then be held in place until it is desired to use such attachment (30) whereupon, a reverse procedure is utilized wherein the attachment is pushed towards the spring (26) and then rotated to the left as seen in FIG. 5 until the pin (23) is aligned with the first slot (33), at which time the attachment can be pulled downwardly and off of the post (19).

The attachment (30) can then be attached in a similar way to a food mixer. It will be understood of course, that the top end of each of the attachments (28 and 29) would be substantially identical to the top end (31) of the attachment (30) shown in FIGS. 5 and 6 and can be attached and detached to the posts (19) in an identical way.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practised otherwise than as specifically described.

We claim:

1. An apparatus consisting of in combination comprising:
   a kitchen cabinet;
   an elongated housing having a top surface and a bottom surface provided with a plurality of openings;
   means for attaching the top surface of said housing to said kitchen cabinet; wherein each of said plurality of openings in the bottom surface of said elongated housing is provided with:
   a cylindrical post disposed about a vertical axis, and attachment at the top end thereof to said housing and extending away from said housing to a free end on the bottom end thereof;
   a cylindrical pin disposed about a substantially horizontal axis being attached at one end thereof to a portion of said post and projecting radially outwardly therefrom and being spaced between the bottom end of the post and said housing;
   an annular washer disposed around said post and located between said pin and said housing, the inner diameter of said annular washer being slightly larger than the outer diameter of said post whereby said annular washer can slide on said post;
   a helical compression spring means disposed around said post and having one end in abutment with said housing and the other end in abutment with said annular washer for biasing said annular washer toward said pin; and
   an attachment to a food mixer adapted to be rotated about an axis and having means on one end thereof for attachment to either a food mixer or said post and said pin, said means on said one end including a wall forming a circular opening, said circular opening having an inner diameter slightly larger than the outer diameter of said post, said circular opening being formed about an axis coincident with the axis of said post, a first slot formed in said wall adjacent said circular opening and along a major length of said wall, said first slot being disposed generally parallel to the axis of said circular opening, a second slot having one end thereof connected to the bottom of the first slot, said second slot extending in a direction along an arc around the axis of said circular opening and having a notch disposed in the other end thereof whereby the attachment can be moved to cause the post to be received into the circular opening and the pin into the first slot, whereupon the one end of the attachment can be used to push the annular washer away from the pin until the pin is received into the second slot, whereupon the attachment can be rotated until the pin is received in said notch, at which time the attachment can be stored on the post for later removal to be attached to a food mixer when desired.

* * * * *